US007004725B2

(12) United States Patent  
Vache et al.

(10) Patent No.: US 7,004,725 B2  
(45) Date of Patent: Feb. 28, 2006

(54) DEVICE FOR CENTERING A TUBE IN A TURBINE SHAFT

(75) Inventors: Jean-Bernard Vache, Le Havre (FR); Jean-Luc Soupizon, Vaux le Penil (FR); Christophe Galand, Samoreau (FR)

(73) Assignee: Snecma Moteurs, Paris (FR)

( * ) Notice: Subject to any disclaimer, the term of this patent is extended or adjusted under 35 U.S.C. 154(b) by 321 days.

(21) Appl. No.: 10/416,161

(22) PCT Filed: Nov. 29, 2001

(86) PCT No.: PCT/FR01/03754

§ 371 (c)(1),
(2), (4) Date: May 15, 2003

(87) PCT Pub. No.: WO02/44538

PCT Pub. Date: Jun. 6, 2002

(65) Prior Publication Data

US 2004/0025494 A1    Feb. 12, 2004

(30) Foreign Application Priority Data

Nov. 30, 2000   (FR) .................................. 00 15473

(51) Int. Cl.
*F01O 5/08*     (2006.01)
*F01O 25/00*    (2006.01)
(52) U.S. Cl. ................ 416/93 R; 416/96 R; 416/97 R; 416/248; 415/111; 415/115; 415/216.1

(58) Field of Classification Search .............. 416/93 R, 416/94, 244 A, 248, 95, 96 R, 96 A, 97 R; 415/110–111, 115, 216.1; 60/796; 403/297–280, 403/365–372, 374.1, 374.2, 374.3
See application file for complete search history.

(56) References Cited

U.S. PATENT DOCUMENTS

| 2,222,494 | A | * | 11/1940 | Barlow ........................ 403/371 |
| 2,554,368 | A | * | 5/1951 | Ledwith .................... 416/96 R |
| 3,556,676 | A | * | 1/1971 | Gorbunov et al. ......... 416/96 R |
| 4,872,767 | A | * | 10/1989 | Knapp ........................... 384/99 |
| 5,073,036 | A | * | 12/1991 | Sutton et al. ................ 384/107 |
| 5,603,574 | A | * | 2/1997 | Ide et al. ..................... 384/117 |
| 6,162,018 | A | * | 12/2000 | Beeck et al. .............. 416/96 R |

* cited by examiner

Primary Examiner—Christopher Verdier
(74) Attorney, Agent, or Firm—Bacon & Thomas PLLC

(57) ABSTRACT

A device for centering a component positioned inside and rotationally secured at its end to a turbine hollow shaft positioned in a gas turbine engine. The device includes a sheath enclosing and solidly joined to the component, and an elastic ring interposed between the sheath and the shaft. The ring includes a plurality of pairs of opposed shoes extending radially outwardly therefrom and configured to radially expand so as to extend against an inner portion of the shaft. The shoes include thin, elastic cylindrical walls having an external diameter configured slightly less than the internal diameter of the shaft prior to assembly onto the shaft, and arranged to expand to the inner wall of the shaft when assembled thereon.

11 Claims, 8 Drawing Sheets

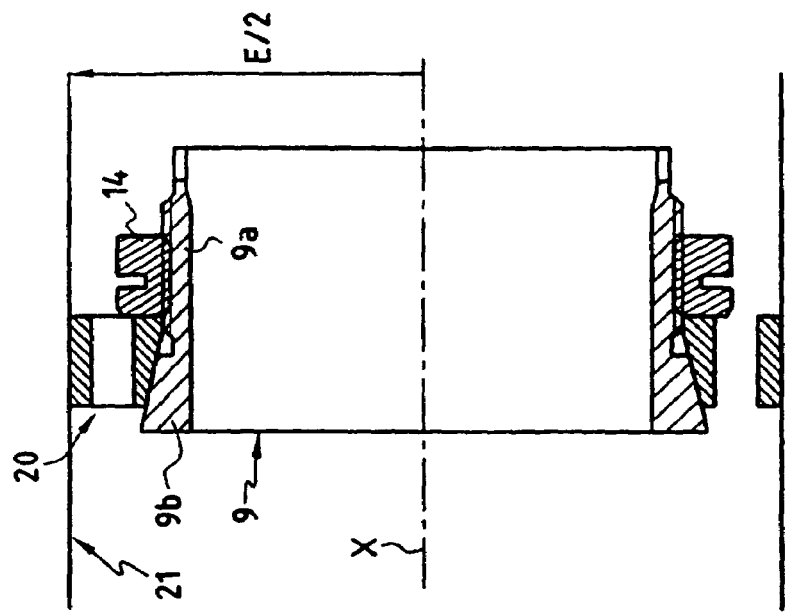
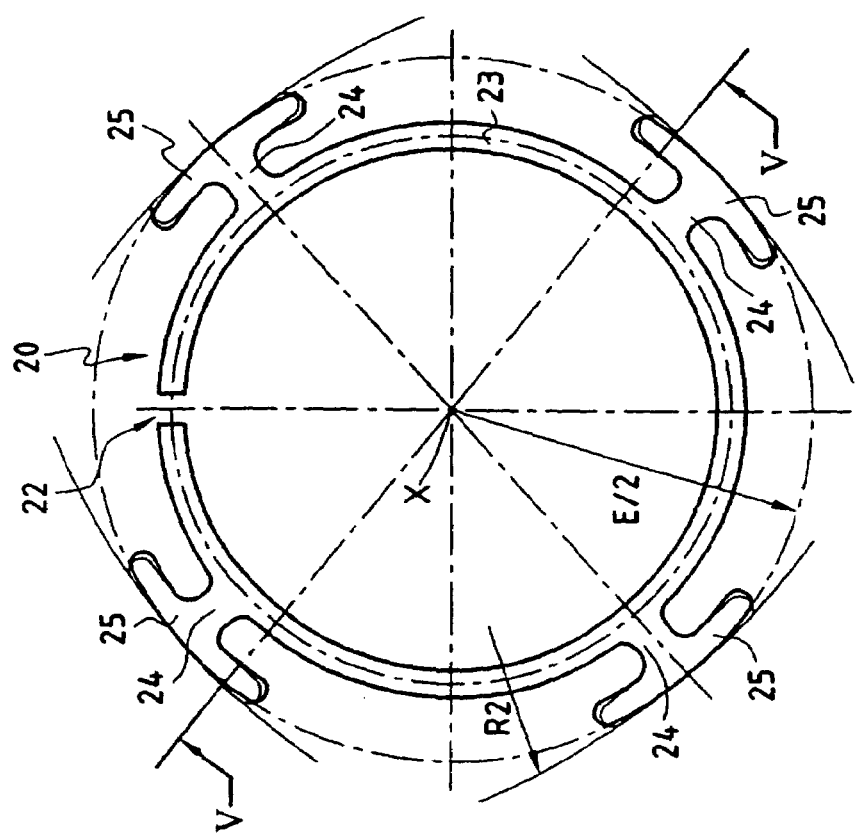
FIG.5
FIG.4

DEVICE FOR CENTERING A TUBE IN A TURBINE SHAFT

BACKGROUND OF THE INVENTION

The present invention relates to a device for centering a tube or a component within a hollow turbine shaft of a gas turbine engine, the tube or the component being rotationally ganged at its ends to the shaft, the device comprising a sheath rigidly affixed to and enclosing the tube or component, further comprising an elastic ring inserted between the sheath and the shaft and fitted with radially outward running shoes, and means allowing ring expansion subsequent to assembly in order that the shoes shall rest against the shaft's inside wall.

As regards to aircraft gas turbine engines, they comprise a tube coaxially configured inside the hollow central shaft to connect the low pressure turbine to the low pressure compressor and, as called for, to the fan, the tube allowing exposing the rotor-supporting, front and rear bearing casings to the ambient air. The tube also allows evacuating a given rate of oil bearing air.

This tube runs along the full length of the turbine shaft and at its ends is fitted with rest means rotationally connecting it to the shaft. This tube is quite elongated and exhibits a relative thin wall because it doesn't transmit any torque. Accordingly, its transverse moment of inertia is small. Consequently, if there were even very slight mass imbalances, they would degrade tube behavior during gas turbine engine operation and flexural excursions might arise in it with ensuing damage to it and adjacent components.

As a precaution, at least one centering component is mounted between the two end supports of this tube in order to maintain the central tube zone within the hollow shaft.

FIG. 1 shows an aircraft gas turbine engine 1 having an axis X and comprising a tube 3 with axis X inside the low pressure turbine shaft 2. This tube 3 enables the rotor-supporting front and rear casings 4 and 5 of the front and rear bearings 6 and 7 to communicate with the ambient air. This tube 3 is rotationally ganged at its ends to the low pressure turbine shaft 2. Two centering systems 8a, 8b are configured between the ends of the tube 3 to coaxially keep the segments of this tube 3 within the shaft 2 and in this manner to prevent it from flexing. FIGS. 2 and 3 show the configuration of the present-day centering systems 8a and 8b. The thin-walled tube 3 comprises a reinforced annular segment 3a around which is mounted a sheath 9 which is fitted at its end 9a with an outside thread 10 and at its other end 9b with a peripheral conical wall 11 diverging into the extension of the thread 10.

An elastic split ring 12 of which the inside wall also is conical is moved by the threaded end 9a onto the sheath 9. A nut 14 fitted with an inside thread matching the thread 10 displaces the ring 12 on the conical wall 11. As a result the ring 12 expands.

The elastic split ring 12 is shown in detail in FIG. 3 and comprises a peripheral surface of substantially square cross-section with rounded corners 15, the curvature of the latter being matched to the particular inside diameter of the shaft 2. When the ring 12 expands, the corners 15 come to rest against the inside wall of the shaft 2.

In this manner the elastic ring 12 exhibits four cross-sectionally radial rigid shoes that are externally bound by the corners 15 and are pairwise connected by ring segments of lesser radial cross-section.

The elastic ring 12 comprises a lateral slit 16 and behaves like an assembly of two cantilevered beams embedded in the zone 17 which is diametrically opposite the slit 16. Along the beams, the magnitudes of bending torque and of deflection are variable and, as a result, the support stresses are not the same at the four support zones. Hence, the contact stresses between the elastic ring 12 and the turbine shaft 2 also are different along the support sites.

Occasionally the magnitudes of the stresses are prohibitive and, as a result, imprints may be imparted to the inside bore of the turbine shaft 2: serious consequences may ensue considering that this shaft 2 undergoes considerable torsion.

SUMMARY OF THE INVENTION

The objective of the present invention is to propose a device maintaining a tube inside a shaft in the manner already cited above and precluding imprinting the shaft's bore.

This goal is attained by the invention in that the shoes are fitted with elastic and thin, cylindrical walls, and at rest, exhibit an outside diameter which is slightly different from the inside hollow shaft's inside diameter while after assembly they will hug the shaft's inside wall.

Accordingly, the radial cross-section of the shoes of the invention, as seen in a plane containing the gas turbine engine's axis of rotation, is clearly less than that of the shoes of the prior art. This design ensures that the radial stresses caused by the tightening torque shall be spread over a larger area, and it reduces the contact stresses between the shoes and the turbine shaft's bore.

In a first embodiment of the present invention, the ring is an elastic, split ring and the means allowing ring expansion following assembly comprise a male/female cone system configured on the sheath and on the ring, with a nut assuring axial ring displacement by being tightened on the sheath, the ring's radial expansion, and the deformation of the thin shoes walls.

In a first variation of the first embodiment of the present invention, the split ring comprises a substantially cylindrical inside wall and each foot is connected by its center axial zone to the cylindrical inside wall by a radial wall and exhibits a flexible lip on each side of the radial wall.

In this first variation, the outside diameter of the shoes at rest is larger than the inside shaft diameter and will decrease during assembly.

In a second variation, the split ring comprises several cylindrical segments alternating with the shoes, the ends of each foot being respectively imbedded in the two adjacent cylindrical segments.

In this second embodiment, the outside diameter of the shoes at rest also is less than the inside shaft diameter and will increase during assembly.

In a second embodiment of the present invention, each foot comprises a thin cylindrical wall of which the outside diameter at rest is less than the inside shaft diameter, and each foot is fitted, at each thin wall end, with an arcuate element, the elements being axially kept in place by two elastic clips to constitute a ring which, at rest, exhibits a lesser diameter than the outside sheath diameter.

In a first variation of the second embodiment of the present invention, the sheath comprises a shoulder to axially maintain the elements on a cylindrical sheath segment, the sheath furthermore being fitted on the shoulder side with a bevel allowing the ring and the clips to expand during ring assembly by tightening a nut on the sheath.

Advantageously, four shoes regularly distributed around the gas turbine engine's axis of rotation are provided.

In another variation of the second embodiment of the present invention, the means allowing ring expansion during assembly comprise a male/female cone system configured on the sheath and on the elements, and a nut, which when tightened onto the sheath, assures the axial displacement of the elements, the radial expansion of these elements and of the clips, and the deformation of the thin shoes walls.

In another advantageous feature of the present invention, and for the case of rest, the circle subtended by the outer sides of the shoes shall be of a diameter slightly less than that of the shaft's in order to allow installing the device of the invention in the turbine bore before mounting the tube.

BRIEF DESCRIPTION OF THE DRAWINGS

Other advantages and features of the present invention are elucidated in the following illustrative description and in relation to the attached drawings.

FIG. 4 is a front view of the elastic split ring of the first variation of the first embodiment of the present invention, FIG. 5 is a section along a radial plane through the gas turbine engine's axis of rotation of the centering device of the invention under a first variation of a first embodiment, the split ring being sectioned along line V—V of FIG. 4.

DETAILED DESCRIPTION OF THE INVENTION

Figure 1:
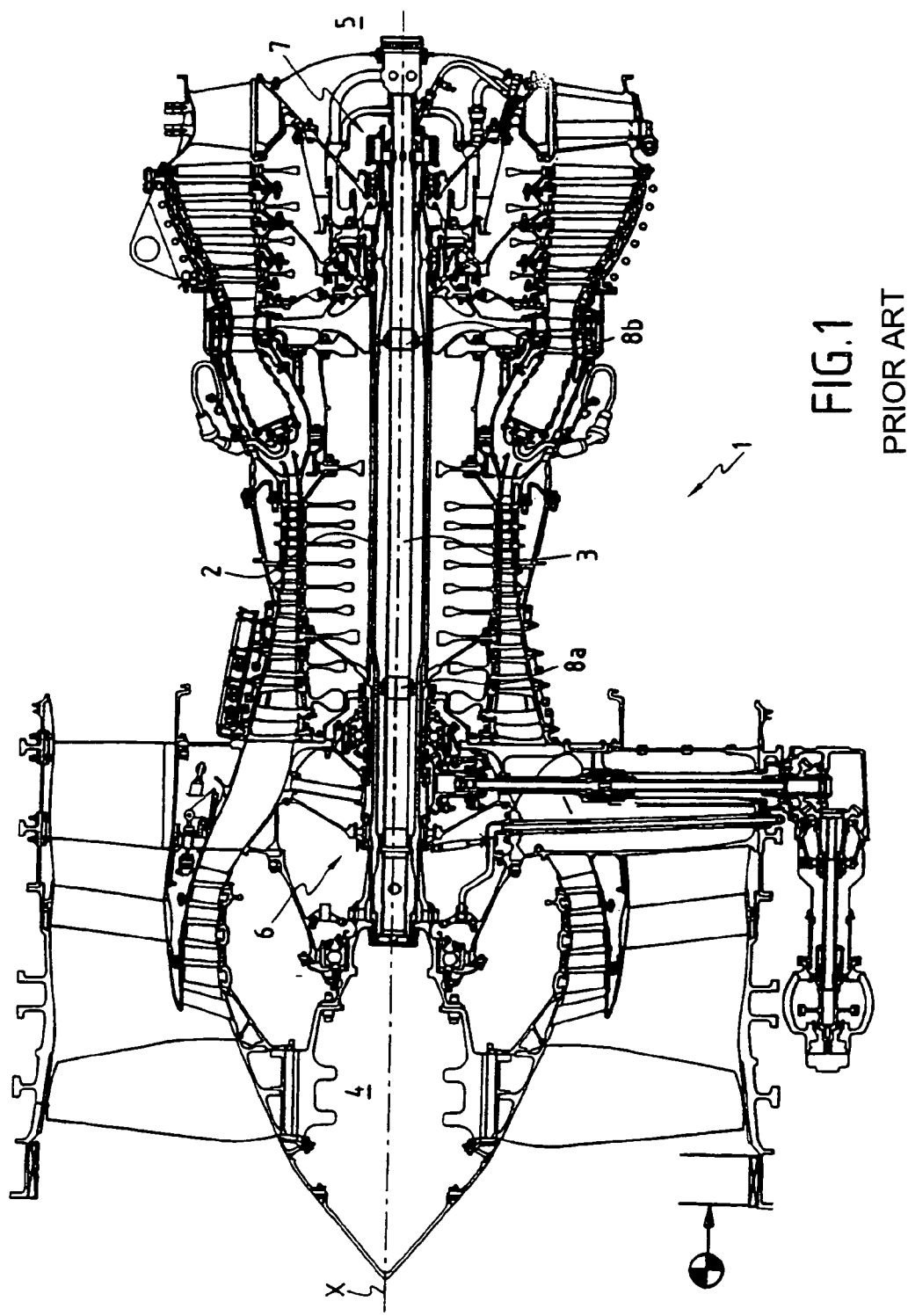
FIG. 1 is a cross-section of a gas turbine engine showing the tube centering device mounted coaxially inside the low pressure turbine shaft.
Figure 2:
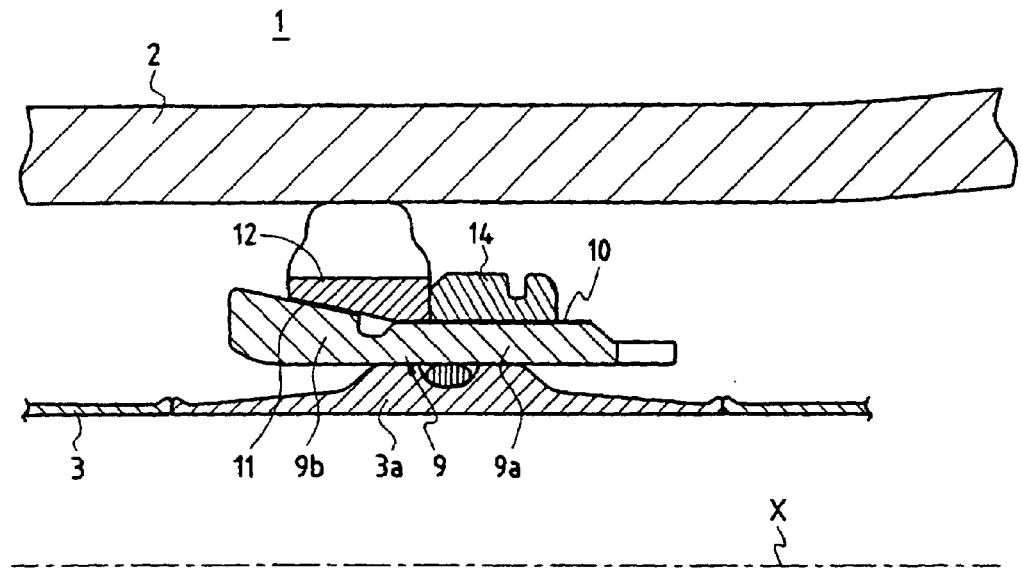
FIG. 2 is a section of a centering device of the prior art.
Figure 3:
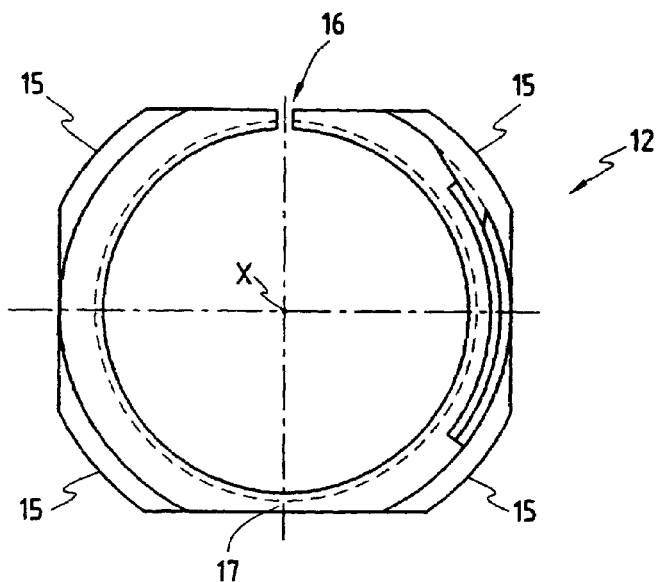
FIG. 3 is a front view of the elastic split ring of the prior art.

Having already been discussed in the above introduction, further discussion of FIGS. 1 through 3 is not necessary.

The tube 3 of the invention comprises, as in the prior art, a reinforced front segment, omitted from FIGS. 4 through 14, around which is mounted a sheath 9 comprising a first threaded end 9a and a second threaded end 9b running in the extension of the threaded end 9a to receive an expansible ring 20. The ring 20 is retained on the sheath 9 by a nut 14 fitted with an inside thread which cooperates with the thread of the end 9a of the sheath 9. The ring 20 is inserted between the sheath 9 and the inside wall 21 of the turbine shaft 2. For sake of clarify, only the inside wall 21 of the turbine shaft 2 is shown in FIGS. 4 through 14. After the centering device has been inserted into the bore of the turbine shaft 2 and after the tube 3 has been installed, the inside wall 21 exhibits a radius E/2 relative to the ring 20.

In a first embodiment of the invention, the ring 20 is fitted with a slit 22 of the already described state of the art.

In a first variation of the first embodiment of the invention shown in FIGS. 4 through 7, the expansible ring 20 comprises an inner and substantially cylindrical wall 23 which, following assembly, will enclose the sheath 9.

Several or four radial walls 24 bearing at their ends cylindrical and thin-walled shoes 25 run around the inside wall 23, and radially outward in orthogonal planes intersecting each other along the gas turbine engine's axis of rotation X.

Each foot 25 is fitted on each side of the radial support wall 24 with a flexible lip 26a and 26b respectively.

Figure 6:
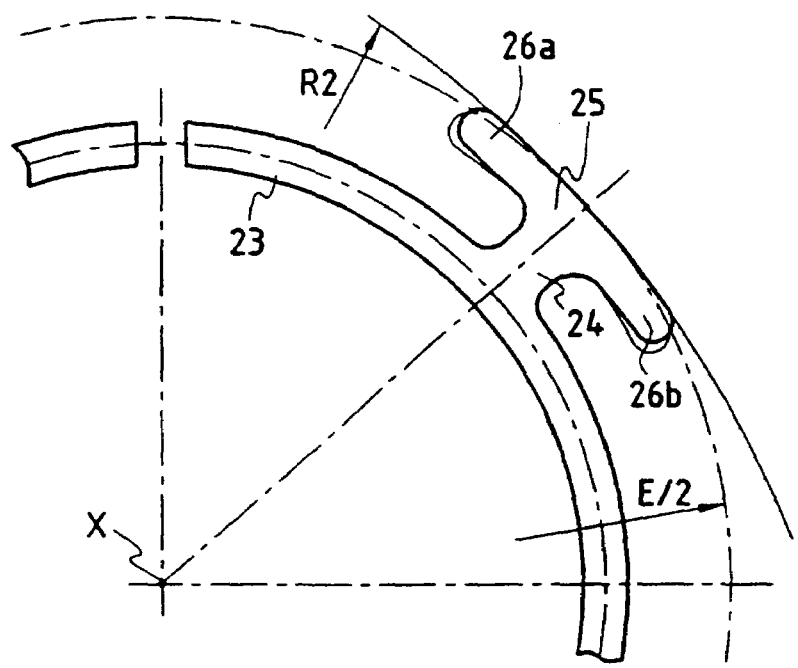
FIG. 6 shows the configuration of a foot of the first variation prior to assembly.
Figure 7:
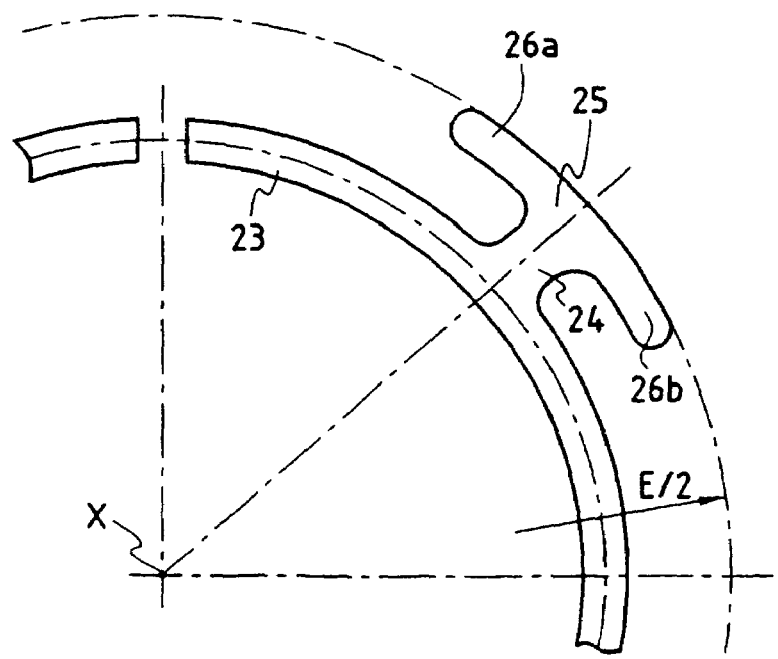
FIG. 7 shows the foot configuration following assembly.

When the shoes 25 are at rest, as shown in FIG. 6, the outside radius of their cylindrical wall is larger than the inside turbine shaft radius E/2. In this case, the diameter of the circle touching the four shoes is greater than the turbine shaft's inside diameter E.

During assembly, the ends of the lips 26a and 26b shall bend when coming into contact with the turbine shaft's bore as the nut 14 is tightened. In the assembled configuration shown in FIG. 7, the outside radius of the cylindrical wall of each foot 25 will equal the turbine shaft radius E/2. Accordingly, each foot 25 rests homogeneously over its entire outside surface against the inside wall 21.

When the nut 14 is tightened, the ring 20 slides over the end 9b of the sheath 9 and expands radially outward due to a conical male/female system configured at the outer periphery of the sheath 9b and at the inner periphery of the ring 20.

The ring 20 and the untightened nut 14 are placed on the sheath 9 when the above centering device is mounted in the turbine shaft. The assembly is inserted into the turbine shaft. The nut 14 is used to apply a tightening torque in order that the axial center zones of the shoes 25 are situated a distance E/2 from the axis X, whereby the lips 26a and 26b are made to bend. Next the tube 3 is mounted in place.

Figure 9:
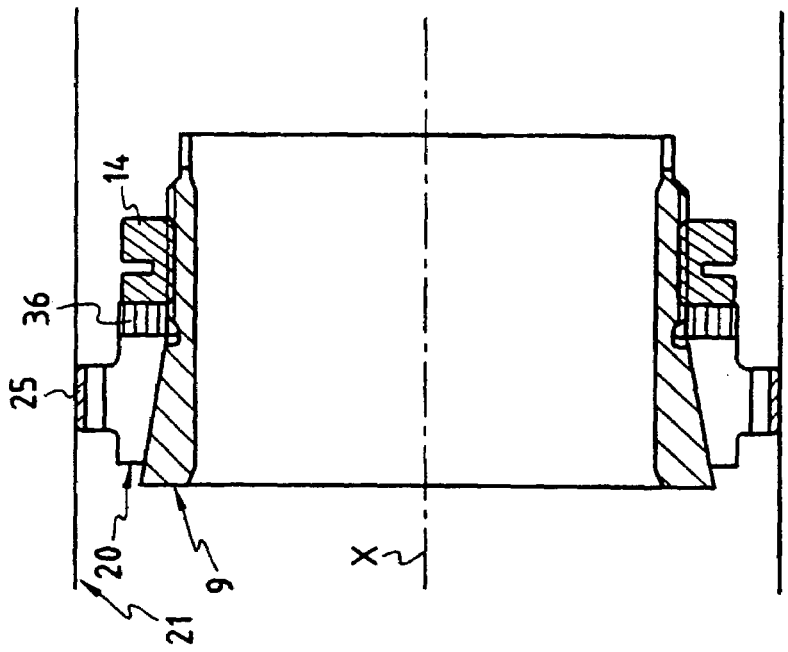
FIG. 9 is a section along an axial plane through the gas turbine engine's axis of rotation of the centering device of the invention according to the second embodiment variation, the split ring being sectioned along line IX—IX of FIG. 8.
Figure 8:
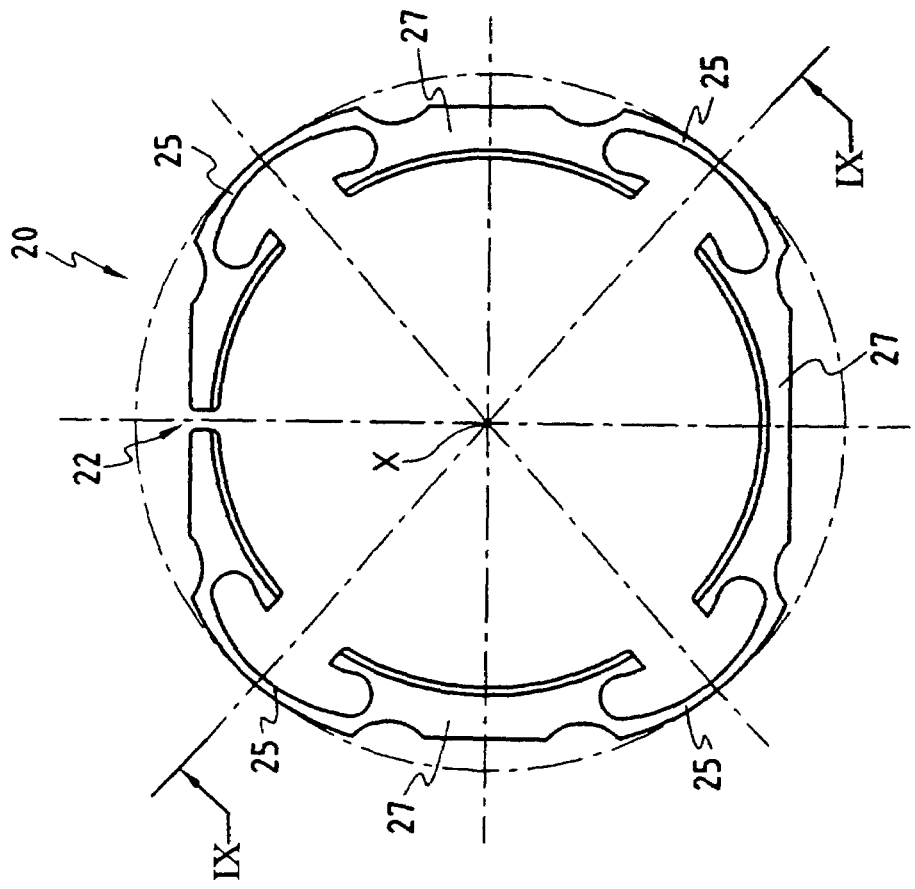
FIG. 8 is a front view of an elastic split ring of a second variation of the first embodiment of the invention.
Figure 10:
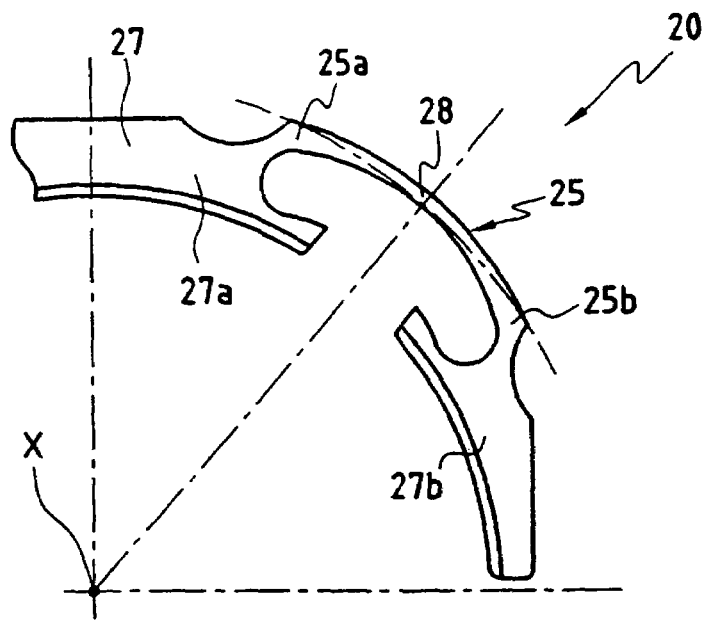
FIG. 10 shows the outside radius of the foot of FIG. 8 before and after assembly.
Figure 13:
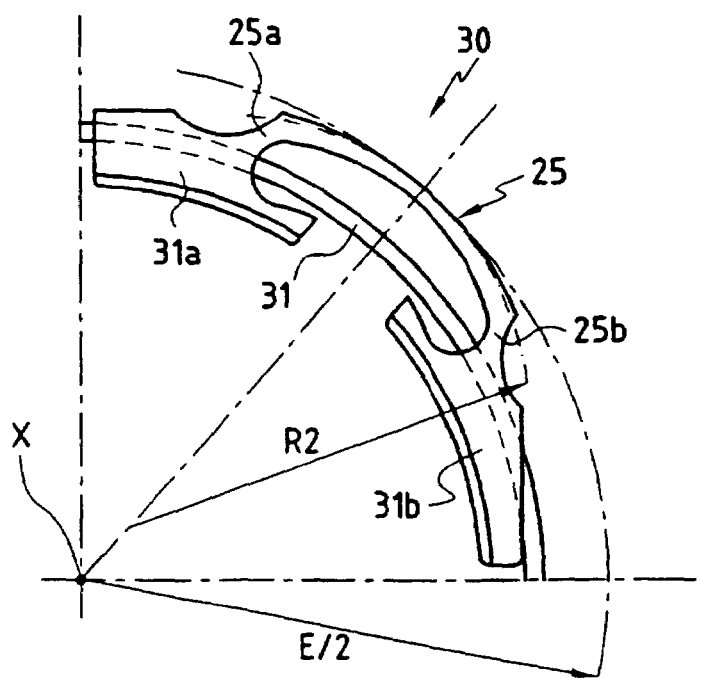
FIG. 13 is a detail of the variation of the outside foot radius while the ring of FIG. 11 is expanding.

Regarding a second variation shown in FIGS. 8 through 10 of the first embodiment of the invention, differing solely from the first variation by the geometry of the ring 20, the four shoes 25 coming to rest against the turbine shaft's inside wall 21 consist of thin cylindrical walls exhibiting in their rest mode an outside radius R2 less than the turbine shaft's inside radius E/2.

The radially inner part of the ring 20 comprises several cylindrical, circumferentially spaced cylindrical segments 27 alternating with the shoes 25.

The ends 25a and 25b of each foot 25 are respectively imbedded in two adjacent segments 27. A slit 22 is subtended in one of the segments 27.

Expansion of this ring 20 on the sheath 9 by the cone system and by tightening the nut 14 entails an increase of the radius of the circle touching the four shoes 25 at rest.

This second embodiment variation of the centering device is mounted in the same manner as the above described first variation. The foot center zones 28 will bend as a tightening torque is applied by the nut 14 to increase the radius R2 until the shoes's outside radius is the same as the radius E/2 of the turbine shaft. Next, the tube 3 is installed.

The areas of the shoes 25 resting against the turbine shaft's inside wall 21 are substantially larger than those of the state of the art discussed in the above introduction, where the shoes are undeforming rigid blocks alternating with cross-sectionally smaller connecting segments.

In a second illustrative embodiment of the present invention shown in FIGS. 11 through 14, the elastic ring 20 consists of four independent identical elements 30 joined by two annular elastic clips 31.

In its center zone, each element 30 comprises a foot 25 constituted by a thin cylindrical wall of the outside radius R2 less than the turbine shaft's radius E/2. The ends 25a and 25b of each foot 25 are imbedded respectively in two small blocks 31a and 31b which constitute the radially inner and lateral parts of an element 30. The small blocks 31a, 31b are arcuate.

In this manner, each element/sub-assembly 30 assumes an arcuate shape no wider than 90°.

The four elements 30 are joined to each other by two clips 31 received in grooves in the outer peripheral wall of the small blocks 31a and 31b, one of the grooves being situated near the front face of the ring 20 and the other near its rear face.

Small gaps 32 separate the four elements 30 retained by the clips 31. These small gaps 32 will widen when the ring 20 expands.

Figure 12:
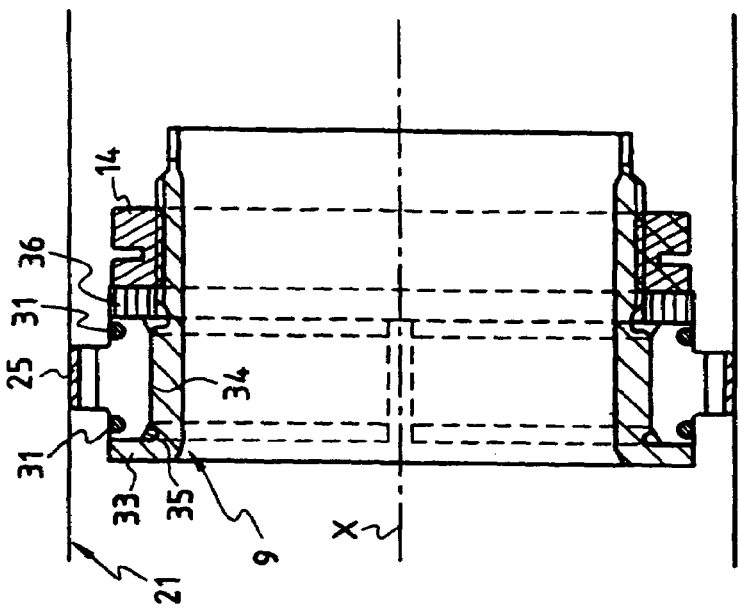
FIG. 12 is a section in an axial plane through the gas turbine engine's axis of rotation of the centering device of the second embodiment of the invention in the assembled state, the ring being sectioned along the line XII—XII of FIG. 11.
Figure 11:
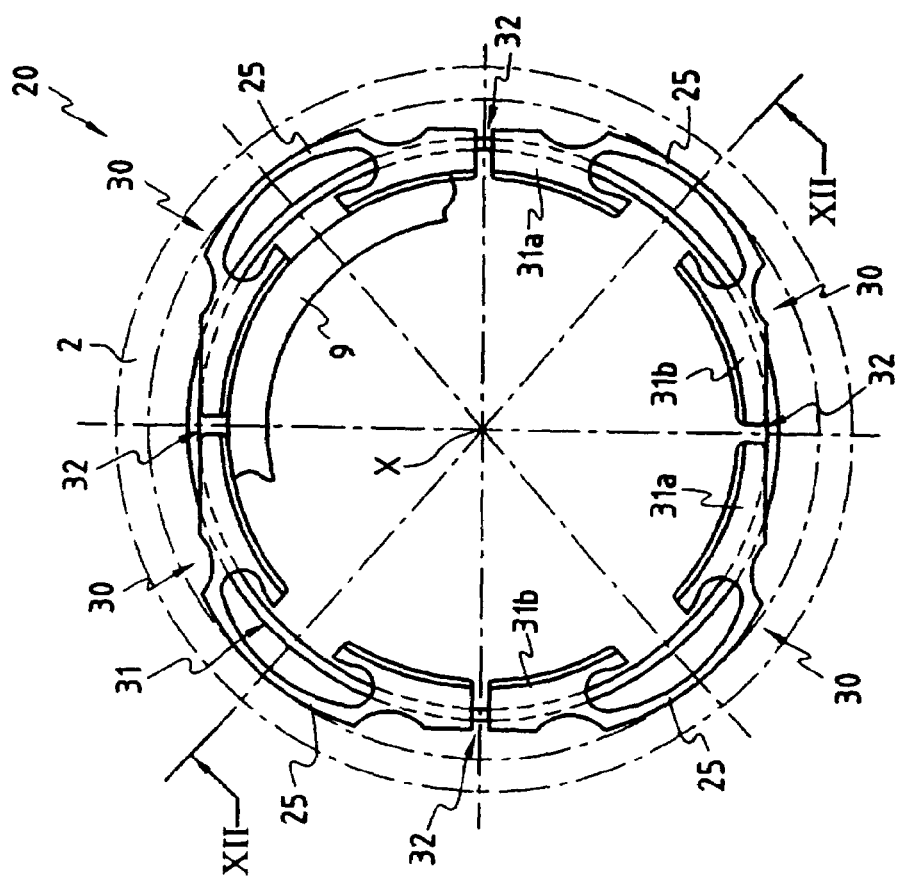
FIG. 11 is a front view of an elastic ring of a second embodiment of the present invention and comprising four independent shoes which are axially maintained in position by two elastic clips.

FIG. 12 shows an embodiment variation of the above assembly of the ring 20 to the sheath 9. The sheath comprises a shoulder 33 running radially outward and supporting a front face of the ring 20. The ring 20 covers a cylindrical sheath portion 34 of a diameter larger than the outside diameter of the threaded end 9a and larger than the inside diameter of the ring 20 before it is mounted on the sheath 9. Near the side of the shoulder 33, the small blocks 31a and 31b are fitted with a bevel 35 provided to expand the ring 20 and the clips 31 when the ring moves on the cylindrical part 34 consequent to tightening the nut 14.

In this rest configuration, the circle touching the outside of the four shoes 25 subtends a radius which is less than the turbine shaft's inside radius E/2. Once the tube has been placed in the turbine shaft, the center axial zones 28 of the shoes 25 are bent and the outside radius of the shoes 25 is substantially equal to the turbine shaft's inside radius E/2.

Figure 14:
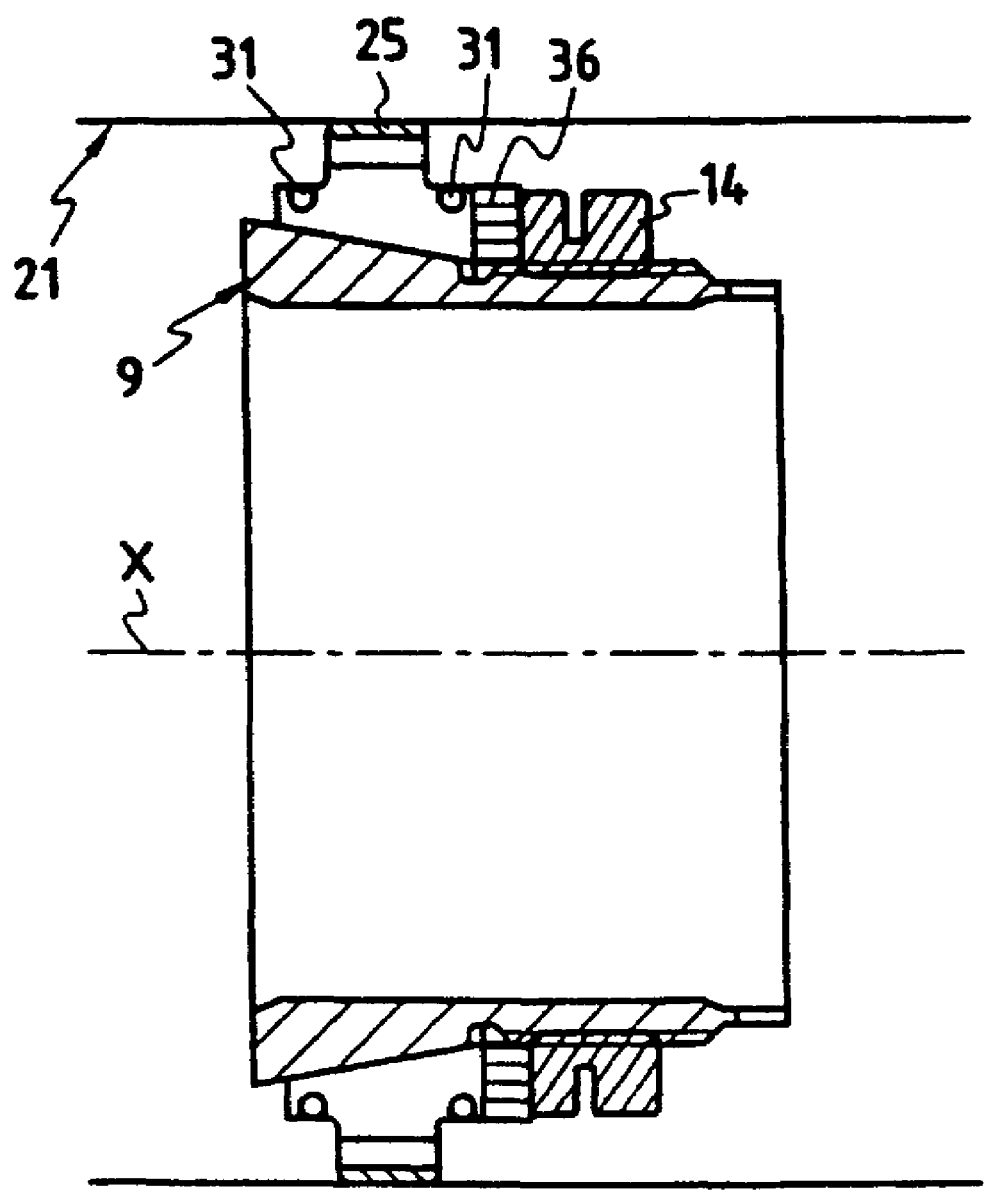
FIG. 14 is similar to FIG. 12 and shows an embodiment variation of the ring's expansion system.

FIG. 14 shows another embodiment variation of assembling the ring 20 to the sheath 9. As in the first embodiment of the present invention, the sheath 9 and the small blocks 31a and 31b comprise a male/female cone system allowing the ring 20 and the clips 31 to expand when the nut 14 is being tightened.

Obviously, a washer 36 may be inserted between the ring 20 and the nut 14 in all the above discussed embodiments and their variations.

The above discussion relates to four shoes 25 on each expansible ring 20. Obviously, the number of shoes may be varied, preferably however being even. What matters foremost is that the shoes be regularly distributed around the turbine's axis of rotation X.

Because the shoes 25 consist of thin and deforming cylindrical walls, the contacting areas of these shoes are relatively large and the stresses are spread over a large surface without entailing prohibitive contact stresses between the centering device and the turbine shaft's bore. As a result, the turbine shaft remains free of imprints.

Moreover, the second embodiment of the present invention provides improved stress distribution over all shoes due to its symmetry.

The invention claimed is:

1. A device for centering a component inside a hollow turbine shaft in a gas turbine engine, said component rotationally secured at its ends of said shaft, said device comprising:
    a sheath solidly joined to and enclosing said component; and
    an elastic ring insertable between the sheath and the shaft, the ring having an elastic and cylindrical thin wall configured with an outside diameter less than an inside diameter of an inside wall of the hollow shaft prior to assembly to the shaft, and a plurality of pairs of shoes extending radially outwardly from the cylindrical wall and configured to expand subsequent to assembly to the component so that the shoes extend against the inside wall of the shaft.

2. The device as claimed in claim 1, wherein the ring is an elastic split ring, the device including a male/female cone system configured on the sheath and on the ring to permit expansion of the ring subsequent to assembly on the shaft, the device further including a nut arranged to be tightened onto the sheath to cause axial displacement and radial expansion of the ring, and the deformation of the thin walls of the shoes.

3. The device as claimed in claim 2, wherein the ring comprises a substantially cylindrical inside wall and each of said shoes is connected at its center axial zone by a radial wall to said cylindrical inside wall and arranged with a flexible lip on each side of said radial wall.

4. The device as claimed in claim 3, wherein the outside diameter of the shoes prior to assembly is larger than the inside diameter of the shaft and configured to decrease during assembly to the shaft.

5. The device as claimed in claim 2, wherein the ring comprises several cylindrical segments alternating with the shoes, the ends of each foot being respectively embedded in two adjacent cylindrical segments.

6. The device as claimed in claim 5, wherein prior to assembly to the shaft, the outside diameter of the shoes is less than the inside diameter of the shaft and is configured to increase during assembly to the shaft.

7. The device as claimed in claim 1, wherein each shoe comprises a thin cylindrical wall, which prior to assembly to the shaft, has an outside diameter which is less than the inside diameter of the shaft, and further comprises an arcuate small block located at each end of said thin wall, said small blocks arranged axially in place by two elastic clips in order to define the ring which, prior to assembly to the shaft, has an inside diameter less than the outside diameter of the sheath.

8. The device as claimed in claim 7, wherein the sheath is arranged with a shoulder to axially maintain the small blocks on a cylindrical segment of the sheath, said small blocks arranged on the side of the shoulder with a bevel allowing the ring and the clips to expand when the ring is installed by tightening a nut onto the sheath.

9. The device as claimed in claim 7, wherein the ring during assembly comprises a male/female cone system configured on the sheath and on the small blocks, and a nut tightened onto the sheath and causing the radial expansion of the small blocks, and the clips and causing the deformation of the thin walls of the shoes.

10. The device as claimed in claim 1, wherein prior to assembly to the shaft a circle defined by the outside of the assembly of the shoes has a diameter less than the inside diameter of the shaft.

11. The device as claimed in claim 1, comprising four shoes which are regularly distributed around the gas turbine engine's axial of rotation.

* * * * *